(12) United States Patent
Nayar et al.

(10) Patent No.: US 9,244,825 B2
(45) Date of Patent: *Jan. 26, 2016

(54) MANAGING CPU RESOURCES FOR HIGH AVAILABILITY MICRO-PARTITIONS

(71) Applicant: International Business Machines Corporation, Armonk, NY (US)

(72) Inventors: Naresh Nayar, Rochester, MN (US); Geraint North, Manchester (GB); Bryan M. Logan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/833,003

(22) Filed: Mar. 15, 2013

(65) Prior Publication Data

US 2014/0281347 A1    Sep. 18, 2014

(51) Int. Cl.
  *G06F 12/02* (2006.01)
  *G06F 9/50* (2006.01)
  *G06F 11/20* (2006.01)

(52) U.S. Cl.
  CPC .............. *G06F 12/02* (2013.01); *G06F 9/5061* (2013.01); *G06F 9/5077* (2013.01); *G06F 11/2038* (2013.01); *G06F 11/2041* (2013.01); *G06F 11/2097* (2013.01); *G06F 2209/5014* (2013.01)

(58) Field of Classification Search
  CPC ..... G06F 12/02; G06F 9/5061; G06F 9/5077; G06F 2209/5014; G06F 11/2038; G06F 11/2041; G06F 11/2097
  USPC ........... 711/147, 154, 170, 173; 718/103, 104
  See application file for complete search history.

(56) References Cited

U.S. PATENT DOCUMENTS 5,345,590 A    9/1994  Ault et al.
5,659,786 A    8/1997  George et al.
(Continued)

FOREIGN PATENT DOCUMENTS

EP    1089173 A2    4/2001

OTHER PUBLICATIONS

Neeraj Bhatia, "Capacity Planning and Performance Management on IBM PowerVM Virtualized Environment", Oct. 7, 2011. Retrieved on Dec. 14, 2014 from <http://neerajbhatia.files.wordpress.com/2011/10/powervm_capacity_planning.pdf>.*

(Continued)

*Primary Examiner* — Arpan P. Savla
(74) *Attorney, Agent, or Firm* — Penny L. Lowry; Grant Johnson

(57) ABSTRACT

Profile properties in a partition profile are user-configurable through a management entity such as a management console. A partition manager calculates a secondary processing unit entitlement for a logical partition based in part on a secondary processing unit mode property in the partition profile. The secondary processing unit entitlement may be smaller than a primary processing unit entitlement for the logical partition. The partition manager reserves processing units from a secondary shared processor pool equal to the logical partition's secondary entitlement for the logical partition. The primary and secondary processing unit entitlements may be stored in primary and secondary configuration data structures associated with the logical partition. The partition manager may relocate the logical partition to the secondary shared processor pool in response to a predetermined condition.

9 Claims, 6 Drawing Sheets

(56) References Cited

U.S. PATENT DOCUMENTS

| | | |
|---|---|---|
| 6,587,938 B1 | 7/2003 | Eilert et al. |
| 6,625,638 B1 | 9/2003 | Kubala et al. |
| 6,957,435 B2 | 10/2005 | Armstrong et al. |
| 7,613,897 B2 | 11/2009 | Armstrong et al. |
| 8,015,431 B2 | 9/2011 | Baba et al. |
| 8,255,639 B2 | 8/2012 | Heyrman et al. |
| 8,302,102 B2 | 10/2012 | Anand et al. |
| 8,688,923 B2 | 4/2014 | Jacobs et al. |
| 2003/0074606 A1 | 4/2003 | Boker |
| 2004/0111596 A1 | 6/2004 | Rawson, III |
| 2008/0162983 A1* | 7/2008 | Baba et al. ............ 714/3 |
| 2009/0307440 A1 | 12/2009 | Jacobs et al. |
| 2011/0022882 A1* | 1/2011 | Jaehde et al. ............ 714/4 |
| 2011/0023028 A1* | 1/2011 | Nandagopal et al. ............ 718/1 |
| 2013/0124817 A1 | 5/2013 | Goto et al. |
| 2014/0006741 A1 | 1/2014 | Ashok et al. |
| 2014/0007124 A1 | 1/2014 | Ashok et al. |
| 2014/0164709 A1 | 6/2014 | Guthrie et al. |
| 2014/0165056 A1 | 6/2014 | Ghai et al. |
| 2014/0281287 A1 | 9/2014 | Nayar et al. |
| 2014/0281288 A1 | 9/2014 | Nayar et al. |
| 2014/0281289 A1 | 9/2014 | Nayar et al. |
| 2014/0281346 A1 | 9/2014 | Nayar et al. |
| 2014/0281348 A1 | 9/2014 | Nayar et al. |

OTHER PUBLICATIONS

Ghai et al., "Virtual Machine Failover", U.S. Appl. No. 13/711,004, filed Dec. 11, 2012.
Guthrie et al., "Virtual Machine Failover", U.S. Appl. No. 13/710,927, filed Dec. 11, 2012.
Naresh et al., "Managing CPU Resources for High Availability Micro-Partitions," Filed Mar. 15, 2013, U.S. Appl. No. 13/832,849.
Naresh et al., "Managing CPU Resources for High Availability Micro-Partitions," Filed Mar. 15, 2013, U.S. Appl. No. 13/832,936.

* cited by examiner

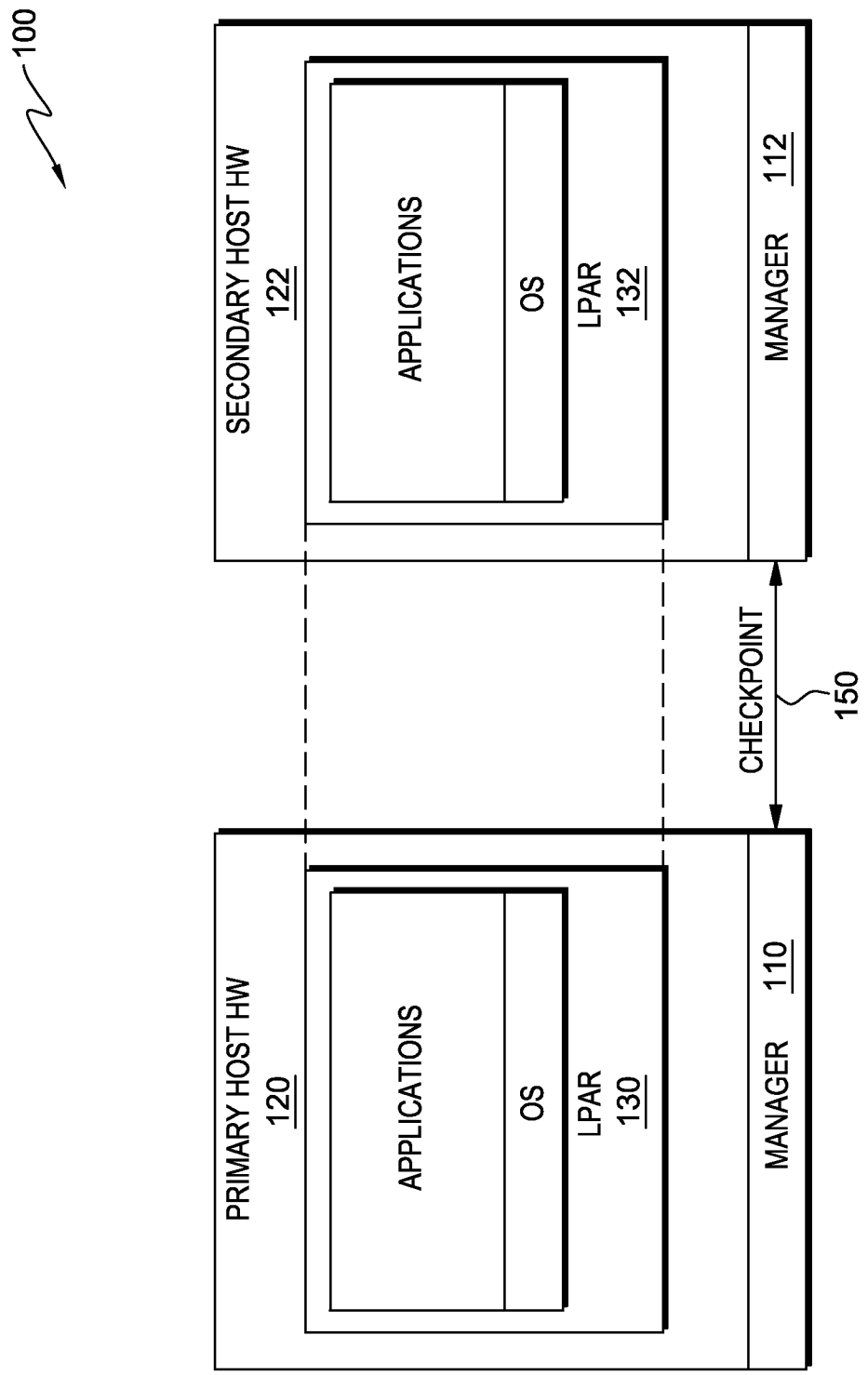

MANAGING CPU RESOURCES FOR HIGH AVAILABILITY MICRO-PARTITIONS

BACKGROUND

This disclosure relates generally to virtualization in computing systems, and more particularly to synchronization, replication, and migration of micro-partitions. A micro-partition in a high availability solution may regularly save its processing state and its memory state to an alternate host machine to provide failover support in the event of a primary host machine failure, and may require the availability of processing resources associated with the alternate host machine in addition to resources associated with the primary host machine.

SUMMARY

Disclosed herein are embodiments of a system for managing a logical partition. The logical partition is associated with a partition profile. The partition profile includes a secondary processing unit mode property. A management entity, such as a management console, displays the partition profile and receives configuration input from a user. A partition manager calculates a secondary processing unit entitlement for the logical partition that is smaller than a primary processing unit entitlement for the logical partition. The calculation is based at least in part on the user-configurable secondary processing unit mode property. The partition manager reserves processing units equal to the secondary entitlement from a secondary shared processor pool for the logical partition. The partition manager may relocate the logical partition to the secondary shared processor pool in response to a predetermined condition, such as a hardware failure.

Also disclosed herein are embodiments of a method for managing a logical partition. The logical partition's partition profile is inspected, and a secondary processing unit entitlement is calculated based at least in part on a secondary processing unit property in the partition profile. The secondary entitlement is less than a primary entitlement for the logical partition. Processing units equal to the secondary entitlement are reserved from a secondary shared processor pool for the logical partition. The primary and secondary processing unit entitlements may be stored in primary and secondary configuration data structures associated with the logical partition.

BRIEF DESCRIPTION OF THE DRAWINGS

FIG. 1 is a block diagram of a portion of an example high availability virtual machine.

In the figures and description, like numbers generally refer to like components, parts, steps, and processes.

DETAILED DESCRIPTION

Figure 2A:
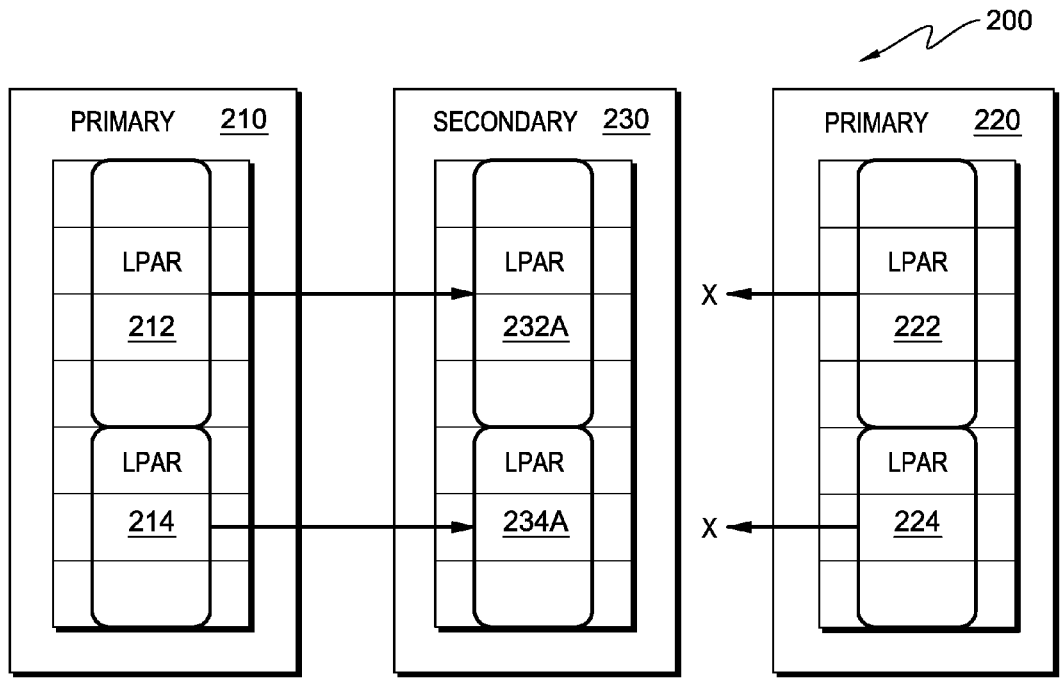
FIG. 2A is a block diagram of a portion of an example configuration for high availability micro-partitions.

A computing system typically consists of computing hardware, such as processors and memory, and operating system software. In more advanced computing systems, the physical hardware can be logically partitioned to create multiple virtual machines, where each logical partition is virtualized as a separate computing system with a separate operating system. System firmware provides a low-level interface between each logical partition and the various hardware components while isolating the logical partition operating systems from the hardware details.

Micro-partitioning is a form of logical partitioning that provides for the fractional allocation of resources from a pool of shared processors to a logical partition. The processing capacity of a micro-partition is described using processing units. One processing unit represents the processing capacity of a single processor core. Processing units represent the time that a partition is dispatched on physical processors, and processing units are used to define the capacity entitlement of a partition. For example, a partition with a 1.0 processing unit entitlement is allocated the processing power of one entire processor core. That processing capacity may be provided by 0.5 of two processor cores, by 0.25 of four processor cores, by 0.5 of one processor core and 0.25 of two processor cores, or by some other configuration of the shared processor pool. For another example, a partition with a 0.9 processing unit entitlement may be allocated 0.9 of one processor core, may be allocated 0.45 of two processor cores, may be allocated 0.8 of one processor core and 0.1 of another processor core, or may be allocated processing capacity from the shared processor pool in some other configuration.

An operating system executing on a logical partition using dedicated processors can calculate the number of operations that it can perform concurrently by counting the whole number of dedicated processors allocated to the logical partition. Conversely, an operating system executing on a logical partition using shared processors cannot calculate a whole number of operations from a fractional processing unit entitlement; however, virtual processors can provide a needed layer of abstraction. A virtual processor is a representation of a physical processor to the operating system of a logical partition that uses shared processors. The system firmware distributes the processing units that are allocated to a logical partition among the virtual processors assigned to that logical partition. For example, if a logical partition is allocated 1.80 processing units and is assigned two virtual processors, then each virtual processor will have a portion of the 1.80 total processing units to support its workload. For example, each of the two assigned virtual processors may have 0.9 processing units supporting its workload.

Logical partitions use virtual processors to access fractions of physical processors. From the system firmware point of view, virtual processors represent dispatching objects. The system firmware dispatches virtual processors to physical processors according to the logical partition's processing unit entitlement. At the end of the system firmware's dispatch cycle, each logical partition has received total processing time equal to that logical partition's processing unit entitlement.

Logical partitions can be capped or uncapped. A capped partition is limited to its processing unit entitlement. But if spare processing power is available in the shared processor pool or if other partitions are not fully using their entitlements, an uncapped partition may be allocated processing units in excess of its entitlement to satisfy its application processing demand.

There can be limits to the number of processing units assigned to a virtual processor. For example, in some logical partition configurations a virtual processor may be assigned no less than 0.10 processing units. Stated another way, those logical partition configurations may be limited to ten virtual processors for each allocated processing unit. Other logical partition configurations may be limited to fewer than ten virtual processors for each allocated processing unit. Still other logical partition configurations may be allowed more than ten virtual processors for each allocated processing unit. In any case, however, the maximum number of processing units assigned to a virtual processor is always 1.0. A virtual processor with a processing unit assignment of 1.0 is the equivalent of a physical processor from the point of view of the system firmware. Consequently, the number of virtual processors assigned to a logical partition provides an upper limit to the partition's potential processing power. A logical partition is unable to utilize processing units in excess of its assigned number of virtual processors, even if the logical partition is uncapped.

A logical partition can generally manage its workload most effectively if its virtual processor assignment is close in value to its processing unit allocation. However, because increasing the number of virtual processors increases the number of operations that can run concurrently, performance may improve under some conditions if the number of virtual processors is increased. But increasing the number of virtual processors assigned without increasing the number of processing units allocated may decrease the speed at which each operation can execute. In addition, splitting the available processing power among many virtual processors may impede the operating system's ability to efficiently shift processing power between processes.

The physical processors in a shared processor pool are typically part of a larger hardware system, which may be referred to as a central electronics complex. In addition to shared processors, a central electronics complex may include dedicated processors, memory, a backplane, and other computer system hardware. To provide failover support in the event of a hardware failure in a logical partition's primary shared processor pool, the logical partition may need to be replicated or partially replicated on an alternate, or secondary, shared processor pool. The secondary shared processor pool may be part of the same central electronics complex as the primary shared processor pool, it may part of a completely separate central electronics complex, or may exist as some combination of the two.

One approach to providing such failover support is to provide a high availability solution. In a high availability solution, a logical partition can be relocated to an alternate environment with little or no loss of performance in response to a hardware failure. High availability may be accomplished by mirroring or otherwise tracking the state of the logical partition in an alternate location, for example by checkpointing, although other methods of providing high availability are contemplated. A portion 100 of an example checkpoint-based high availability virtual machine is illustrated in FIG. 1. Partition manager 110, which may be part of the system firmware, may periodically save the state of primary logical partition 130 and/or report the state to a secondary location 122. In some embodiments, the updated memory state of primary logical partition 130 may be continuously sent to secondary location 122, and state information may be sent whenever primary logical partition 130 is halted. A periodic report 150, may occur, for example, every 25 milliseconds. In some embodiments, a periodic report 150 may include halting execution of primary logical partition 130, sending state information (for example, across a network) to partition manager 112 on secondary host 122, waiting for partition manager 112 to acknowledge receipt of the updated information, and then resuming execution of primary logical partition 130 on primary host 120. In some embodiments, partition manager 110 and partition manager 112 may be separate functions of the same partition manager, while in some embodiments, the partition managers may be separate entities. Furthermore, logical partition 130 may be one of many logical partitions on primary host 120, and each logical partition on primary host 120 may be checkpointed to a location on an alternate host, which may be secondary host 122 or another alternate host not shown in example 100.

The high availability solution example 100 described above may introduce performance overhead resulting from the periodic reporting. The solution is also potentially resource-intensive, because secondary logical partition 132 must have the same amount of memory and processing power available as primary logical partition 130, even though these resources are not completely consumed unless failover actually occurs. Embodiments described herein may reduce the resource requirements for high availability solution 100 when secondary logical partition 132 can perform, at least temporarily, with less processing power than primary logical partition 130. Whether or not logical partition 132 can perform with less processing power, and therefore use fewer processing resources, than logical partition 130 may depend on profile properties, workload, or some combination of profile properties, workload, and other factors. An example configuration is illustrated in FIGS. 2A and 2B.

Figure 2B:
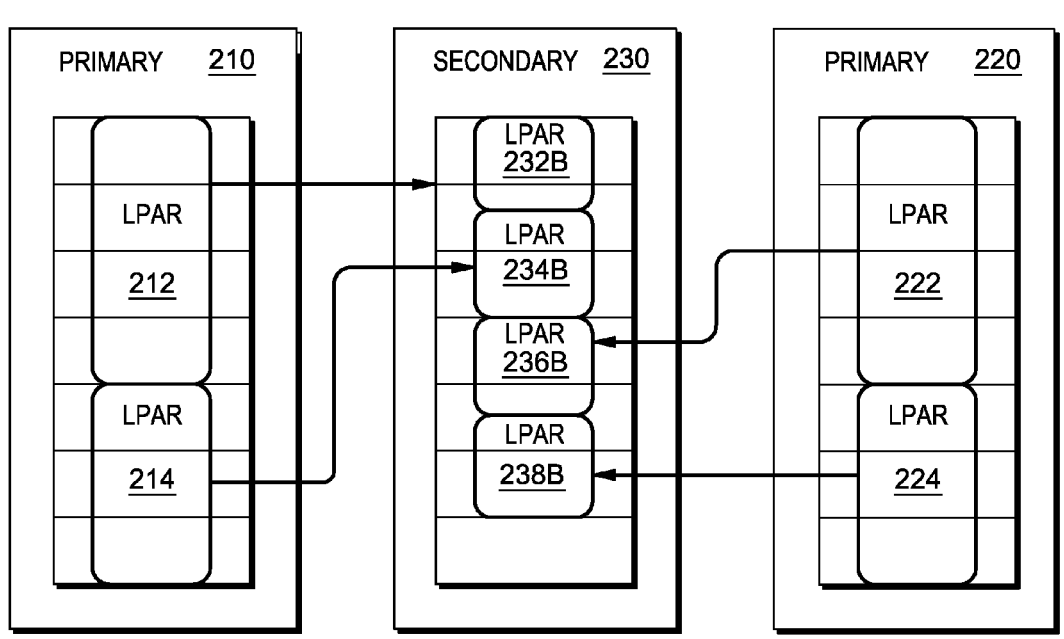
FIG. 2B is a block diagram of a portion of an example configuration for high availability micro-partitions with reduced resource requirements.

In the example configuration 200 for a high availability solution shown in FIG. 2A, logical partition 212 and logical partition 214 are executing on primary central electronics complex 210. Logical partition 222 and logical partition 224 are executing on primary central electronics complex 220. In this example, shared processor pools on central electronics complex 210 and central electronics complex 220 can each provide up to 7.0 processing units. Logical partition 212 has been allocated 4.0 processing units, logical partition 214 has been allocated 3.0 processing units, logical partition 222 has been allocated 4.0 processing units, and logical partition 224 has been allocated 3.0 processing units. The processing unit allocations for logical partitions 212, 214, 222, and 224 may have been determined when the logical partitions were first activated, for example through logical partition profile properties. Properties of logical partitions may be user-controllable and may include, for example, the minimum number of processing units, the desired number of processing units, the maximum number of processing units, and which shared processor pool to use. The logical partition profile properties may also include the minimum number of virtual processors, the desired number of virtual processors, the maximum number of virtual processors, and whether the partition is capped or uncapped. Various embodiments may include all, part, or none of the above profile properties, and may include properties not specified here. Furthermore, logical partition assignments and allocations may be dynamically adjusted after activation, for example to take advantage of unconsumed system resources or to support higher priority workloads. Dynamic adjustment may be user-controllable (for example through a management console), may be under control of system firmware alone or in combination with a user, or may be controlled in some other manner.

In order to ensure protection against hardware failures in primary central electronics complexes 210 and 220, substantially instantaneous failover of logical partitions 212, 214, 222, and 224 may be provided. A way to provide such protection is by implementing a high availability solution as previously described, in which logical partitions 212, 214, 222, and 224 are continually replicated on an alternate system, illustrated in this example as secondary central electronics complex 230. But because secondary central electronics complex 230 has a processing capacity of only 7.0 processing units, central electronics complex 230 alone is insufficient to provide failover protection for all four logical partitions 212, 214, 222, and 224 with their combined processing unit entitlement of 14.0 processing units.

Should logical partition 212 experience a failover event, logical partition 212 can be relocated to central electronics complex 230 and retain its processing unit entitlement of 4.0 processing units. After such a failover event, the operating system and applications previously executing on logical partition 212 would be executing on logical partition 232A. Such nearly instantaneous failover may be completely transparent to the applications, and largely transparent to the operating system, although the operating system may need to adjust to the new environment after failover.

Should logical partition 214 experience a failover event following the failover of logical partition 212, logical partition 214 can be relocated to central electronics complex 230 and likewise retain its processing unit entitlement of 3.0 processing units. After such a subsequent failover event, the operating system and applications previously executing on logical partition 214 would be executing on logical partition 234A. Because the migration to logical partitions 232A and 234A have completely exhausted the processing resources on secondary central electronics complex 230, secondary central electronics complex 230 is unable to support any subsequent failover of logical partitions 222 or 224. Should logical partitions 222 or 224 require relocation to a secondary host, they must consume additional resources on a different central electronics complex, not shown.

In FIG. 2B, the logical partition configuration example 200 from FIG. 2A is modified to show an example 202 that requires fewer processor resources. Logical partitions 212, 214, 222, and 224 are executing as described above in FIG. 2A. In example 202, however, when logical partition 212 is relocated to secondary central electronics complex 230, logical partition 232B is allocated a smaller number of processing units than primary logical partition 212, specifically 1.5 processing units compared to 4.0 for partition 232A. The size of this reduced secondary processing unit entitlement may be based in whole or in part on primary logical partition 212's profile properties, on partition 212's current assignments and/or allocations, on partition 212's current or expected workload, on some combination of the foregoing, or may be based on other factors. Ideally, the size of logical partition 232B's processing unit entitlement may be reduced as much as is practical without unduly compromising the performance of logical partition 232B's workload, or may be reduced to the minimum entitlement that enables logical partition 232B to continue to meet its service requirements. Many factors may influence the size of the reduction, including but not limited to whether and how quickly repairs can be made to the failing hardware on central electronics complex 210, whether workload can be temporarily shifted away from logical partition 232B, the criticality of logical partition 232B's workload, and the availability of system resources.

Subsequent failovers of primary logical partitions 214, 222, and 224 to secondary logical partitions 234B, 236B, and 238B, respectively, also require fewer processor resources, allowing all four partitions to failover to secondary central electronics complex 230. This eliminates the need for additional resources not shown, as was required in example configuration 200. In example configuration 202, each logical partition 234B, 236B, and 238B has a secondary entitlement of 1.5 processing units for a total of only 6.0 processing units. Central electronics complex 230, with its 7.0 processing units, can therefore provide failover support for a worst-case scenario of all four logical partitions 212, 214, 222, and 224 failing simultaneously or in succession.

The processor resources reserved on secondary central electronics complex 230 for logical partitions 232B, 234B, 236B, and 238B are not consumed until a failover actually occurs. Although these resources are reserved and available should any of the primary logical partitions 212, 214, 222, and 224 experience a failover event, these processor resources need not be idle. In example 202, logical partitions 212, 214, 222, and 224 are running on their primary processing unit entitlements in their respective primary central electronics complexes 210 and 220. Processor resources on secondary central electronics complex 230 represented by logical partitions 232B, 234B, 236B, and 238B are reserved and available for failover processing should the need occur. If any logical partition fails over to central electronics complex 230, although it may be guaranteed availability of a quantity of processing units equal to its secondary processing unit entitlement, under some conditions the relocated logical partition may consume additional unused resources from central electronics complex 230.

Because the quantity of processing units allocated to an uncapped partition can expand dynamically beyond the partition's entitlement in order to take advantage of unused cycles in a shared processor pool, any uncapped logical partition failing over to secondary host 230 may utilize the full amount of available processing units on host 230, even though the amount may exceed the relocated partition's processing unit entitlement. The logical partition may, however, be limited to less than the full amount of available processing units by its configuration, such as by its virtual processor assignment. For example, logical partition 224 running on 3.0 processing units of primary host 220 has a secondary processing unit entitlement of 1.5 processing units; therefore 1.5 processing units are reserved and available on secondary host 230 in case of a failure on primary host 220. Should failover occur, if all of the other logical partitions 212, 214, and 222 are running on their primary hosts, then when logical partition 224 is relocated to host 230, logical partition 224 may be allocated more than its 1.5 secondary processing unit entitlement. Since host 230 has a total of 7.0 processing units available, logical partition 224 may even be allocated more processing capacity on failover than it had on its primary host 220.

Should logical partition 212 then fail over, the shared processor resources on central electronics complex 230 may be redistributed between the two relocated logical partitions 232B and 238B. This redistribution may be proportional to each relocated logical partition's primary processing unit entitlement or the redistribution may be based on a different model. As other logical partitions fail over, the shared processor resources are further redistributed among all relocated logical partitions. Various methods of determining how secondary host resources are distributed may be used, including for example in proportion to the logical partitions' uncapped weight values, but under no circumstances may a relocated logical partition ever receive less than its secondary processing unit entitlement.

A computer system may be user-configurable, for example though a management console, to implement a high availability solution and to take advantage of reduced resource requirements such as those described in example 202. For example, a logical partition may have a profile property designating an option to provide checkpoint-based protection for the logical partition. A management console or its equivalent may also provide a method for a user to designate a secondary host for the logical partition, and may have a list of hosts from which to make a selection. Protected logical partitions may have a profile property designating an option to determine a minimum value for the partition's alternate (secondary) processing unit entitlement. A user may select this option if the logical partition is a micro-partition and if the logical partition can tolerate a smaller processing unit entitlement than its primary processing unit entitlement. In some embodiments, this option may alert the partition manager to assign a secondary processing unit entitlement to the logical partition that is the greater of either the minimum number of processing units specified for the partition (specified, for example, in the partition's profile), or the minimum processing unit entitlement possible given the partition's virtual processor assignment. A user's selecting an "original" option rather than this "minimum" option for a protected partition's secondary processing unit entitlement may provide for a logical configuration as shown in example 200, where a partition's secondary processing unit entitlement is the same as its primary processing unit entitlement. This feature may also be used to restore a relocated logical partition's original entitlement on a subsequent failover, which may actually be a "failing back" to a restored host.

Figure 3:
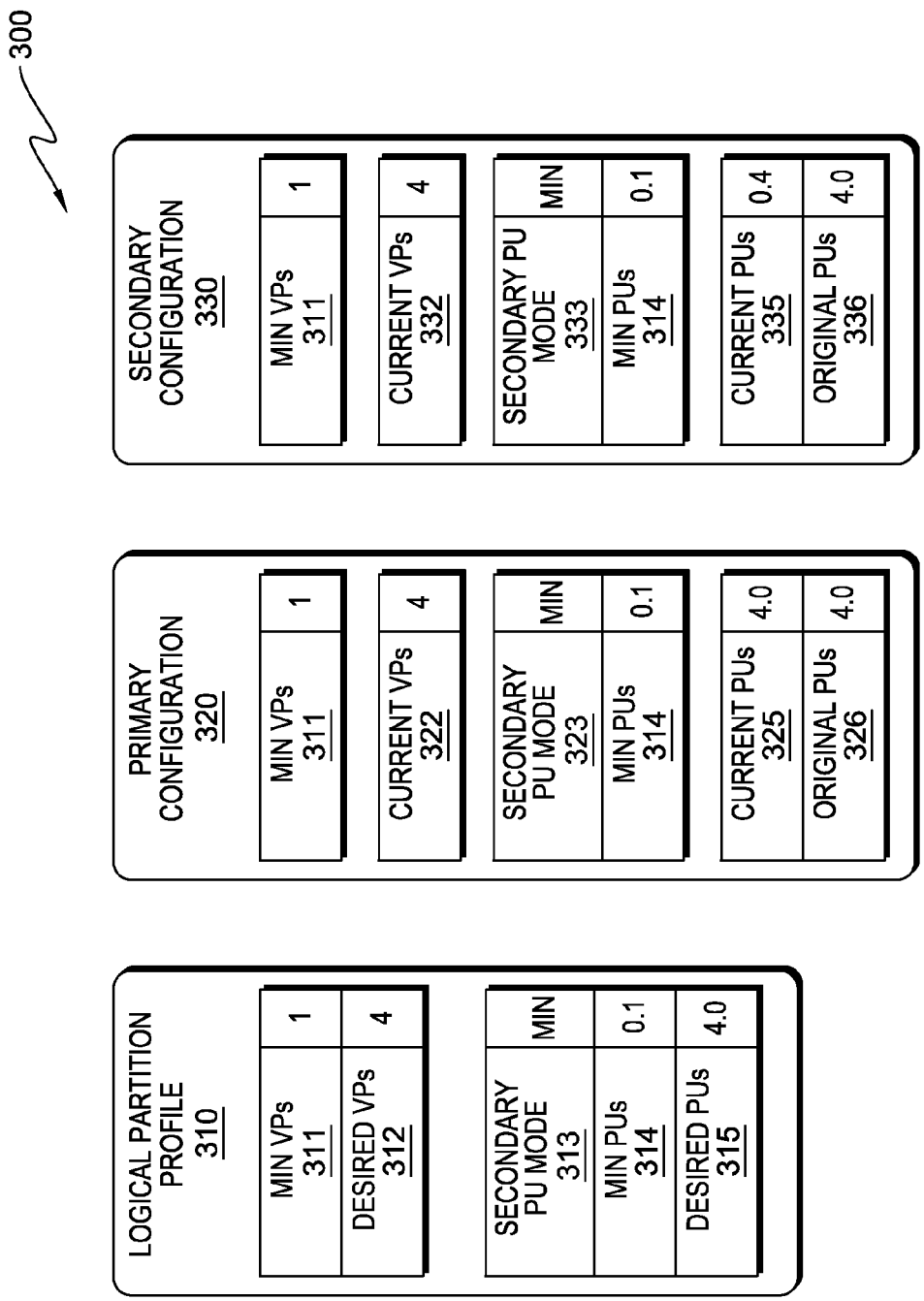
FIG. 3 illustrates a portion of the properties, assignments, entitlements, and allocations for an example high availability micro-partition with reduced resource requirements.

Example 300 in FIG. 3 shows a portion of the properties, assignments, entitlements, and allocations for an example logical partition with a secondary processing unit entitlement less than its primary processing unit entitlement. Properties defining the logical partition may be user-configurable, such as through a management console, in logical partition profile 310. In some embodiments, a management console may be a dedicated workstation that provides a graphical user interface for configuring, operating, and performing basic system tasks, while in some embodiments, the management console may be any entity, such as a system, service, or module, or part of a system, service, or module appropriate for providing information to a user and for receiving information from a user. Five of the possible logical partition profile properties are shown: a minimum virtual processors (VPs) property 311, a desired VPs property 312, a secondary processing unit (PU) mode property 313, a minimum PUs property 314, and a desired PUs property 315.

To understand how the secondary PU mode property 313 may affect the calculation of the secondary processing unit entitlement, it may be useful to first look at how the logical partition's primary configuration 320 is determined when the logical partition is first activated. The logical partition's current VPs 322 is calculated based on the available resources in the system. The current VPs 322 will not be less than the minimum VPs 311 and will not be more than the desired VPs 312. The logical partition's current PUs 325 is also calculated based on the available resources in the system. The current PUs 325 will not be less than the minimum PUs 314 and will not be more than the desired PUs 315. But the current PUs 325 is also limited by a minimum per-virtual-processor processing units limitation. This limitation specifies the number of virtual processors that can be supported by a single processing unit, and in some embodiments may be a fixed system parameter. In this example, the minimum per-virtual-processor processing units limitation is assumed to be 0.10, or ten virtual processors per single processing unit. So the current PUs 325 will not be less than 0.10 times the current VPs 322, even if the minimum PUs 314 is a smaller number. The original PUs 326 is then copied from the current PUs 325.

The logical partition's profile 310 may be stored in a management console save area in flash memory. The logical partition's primary configuration 320 may also be stored in flash memory, and also in the partition manager's data structures. Note that in some embodiments, the desired VPs 312 and the desired PUs 315 may not be stored in the partition manager's data structures.

For maximum user flexibility, in some embodiments the current PUs 325 may be modified while the logical partition is running. This feature may assist in taking advantage of unconsumed system resources, may provide for the redistribution of system resources, and may also assist in restoring a logical partition to its original entitlement without disrupting its workload in the event that its secondary host becomes its permanent home. The original PUs 326 may be synchronized to the current PUs 325 any time a user dynamically modifies the current PUs 325.

The logical partition's secondary configuration 330 may also be stored in flash memory and in the partition manager's data structures. Looking now at how the logical partition's secondary configuration 330 is determined when the logical partition is first activated, the current VPs 332 is copied from the primary configuration's current VPs 322. But for the current PUs 335, the secondary PU mode 213 set to "min" indicates that this logical partition is able to function with less processing power than the primary entitlement should relocation be required. If a logical partition must maintain its normal processing power during a failover, if the logical partition has previously been relocated with reduced processing power, or if other circumstances dictate doing so, then the user would set the secondary processing unit mode property 213 to "original" and the partition manager would ensure that the logical partition's secondary (or tertiary in the case of a restoration) processing unit entitlement is at least as great as its primary processing unit entitlement.

Because the secondary PU mode 213 is set to "min", the current PUs 335 will be either the minimum PUs 314, or 0.10 times the current VPs 322, whichever is larger. In this example the minimum PUs 314 has a value of 0.1 and the current VPs 322 has a value of 4; consequently, the current PUs 335 for secondary configuration 330 is set to 0.10×4=0.4. Although the minimum PUs 314 has a value of 0.1, the current VPs 322 value of 4 restricts the secondary processing unit entitlement to no less than 0.1 per virtual processor.

The original PUs 336 is copied from the original PUs 326 in the primary configuration 320. This field stores the primary processing unit entitlement as calculated for current PUs 325 when the logical partition was first activated. If a logical partition is relocated to an alternate location, perhaps with a reduced processing unit entitlement, it may be desirable to make the alternate host the permanent home for the logical partition. This may be accomplished by setting the current PUs 335 value to the original PUs value 336 and making the new host the logical partition's primary host. Allowing a user to dynamically reconfigure the relocated logical partition provides maximum user flexibility. A logical partition may be activated on a first host, may fail over to a second host, may operate on the second host with a reduced entitlement, may be checkpointed to a third host while operating on the second host, and may have its entitlement restored to its primary entitlement while remaining on the second host, all with little or no disruption of the logical partition's operation.

Following a failover, when the logical partition is running in its secondary location, a user may set the secondary PU mode property to "original". A new alternate is then reserved on a tertiary host with the logical partition's primary processing unit entitlement. This allows the relocated logical partition to "fail over" to the tertiary host, thus restoring the logical partition to its primary processing capacity.

Figure 4:
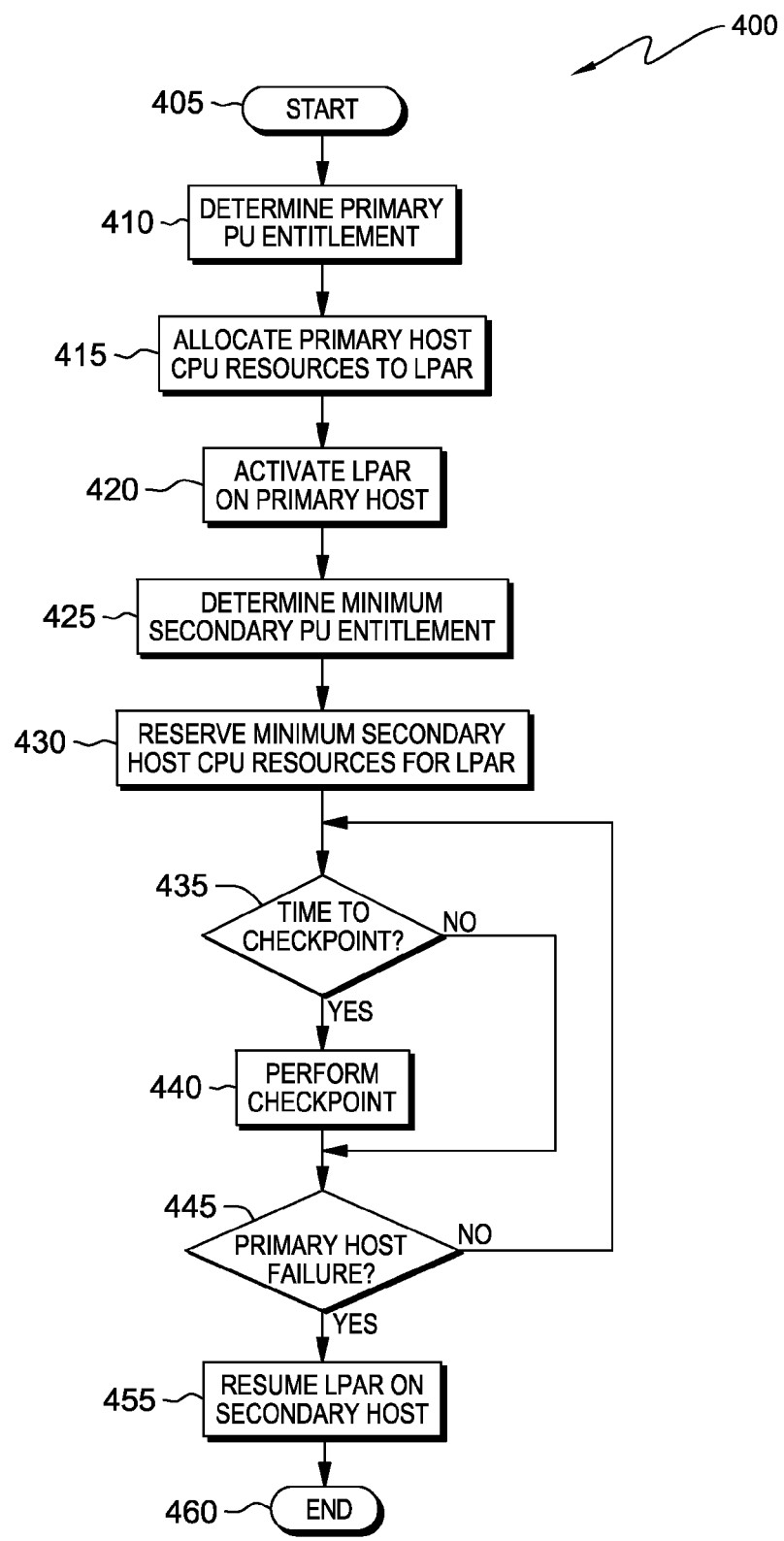
FIG. 4 is a high-level flow diagram for an example method for reducing CPU resource requirements for a high availability micro-partition.

Flow diagram 400 in FIG. 4 is a high-level flow diagram illustrating an example embodiment of a method for reducing CPU resource requirements for a high availability micro-partition. At step 410, the partition manager determines a primary processing unit entitlement for the logical micro-partition (LPAR) based at least in part on primary host system resources and user input. At step 415, the partition manager allocates processing units from the primary shared processor pool equal to the LPAR's primary entitlement and activates the LPAR at step 420. The partition manager then determines at step 425 a secondary processing unit entitlement for the LPAR that is smaller than the LPAR's primary entitlement. The size of the secondary entitlement may be based at least in part on user input and the LPAR's primary configuration, for example on the number of virtual processors assigned to the LPAR. A smaller secondary processing unit entitlement equates to fewer consumed CPU resources on the secondary host should failover occur. At step 430, the partition manager reserves processing units from the secondary shared processor pool equal to the LPAR's secondary entitlement. Note that secondary resources are not consumed by the LPAR unless the LPAR is actually relocated to the secondary host, and secondary resources reserved for the LPAR may be allocated to and consumed by other logical partitions even while reserved for the LPAR.

To protect against hardware and firmware failures on the primary host and to provide for rapid failover, the LPAR is continually synchronized with the secondary host. In example 400, the partition manager uses a checkpointing technique to accomplish this synchronization. At step 435, if it is time to report, then at step 440 the partition manager may temporarily stop the LPAR, send updated information on the memory state and CPU state of the LPAR to the secondary host, wait for acknowledgement of receipt of the state information, and then resume the LPAR. After the report is complete, or if it is not time to report, then at step 445 if a primary host failure occurs, then the partition manager resumes the LPAR on the secondary host at step 455 with a quantity of processing units from the secondary shared processor pool equal to the LPAR's secondary entitlement.

Although example method 400 describes a loop in which a partition manager continually checks whether a failure has occurred on a primary host at step 445 and checks whether it is time to send state information to a secondary host at step 435, this loop is for illustration purposes only and may not reflect the actual methods used. Embodiments may use polling, hardware interrupts, software interrupts, or other techniques for determining when these or other events have occurred or need to be performed. In some embodiments, a special partition on the primary host known as the checkpoint service partition may provide heartbeat services to the partition manager, and may be monitored to determine when a failure has occurred on the primary host. Embodiments for reducing resource requirements for high availability micro-partitions may not perform each step shown in example 400, may perform some or all of the steps in a different order, or may perform additional steps not shown. Furthermore, embodiments may combine several steps or expand individual steps into multiple steps.

Figure 5A:
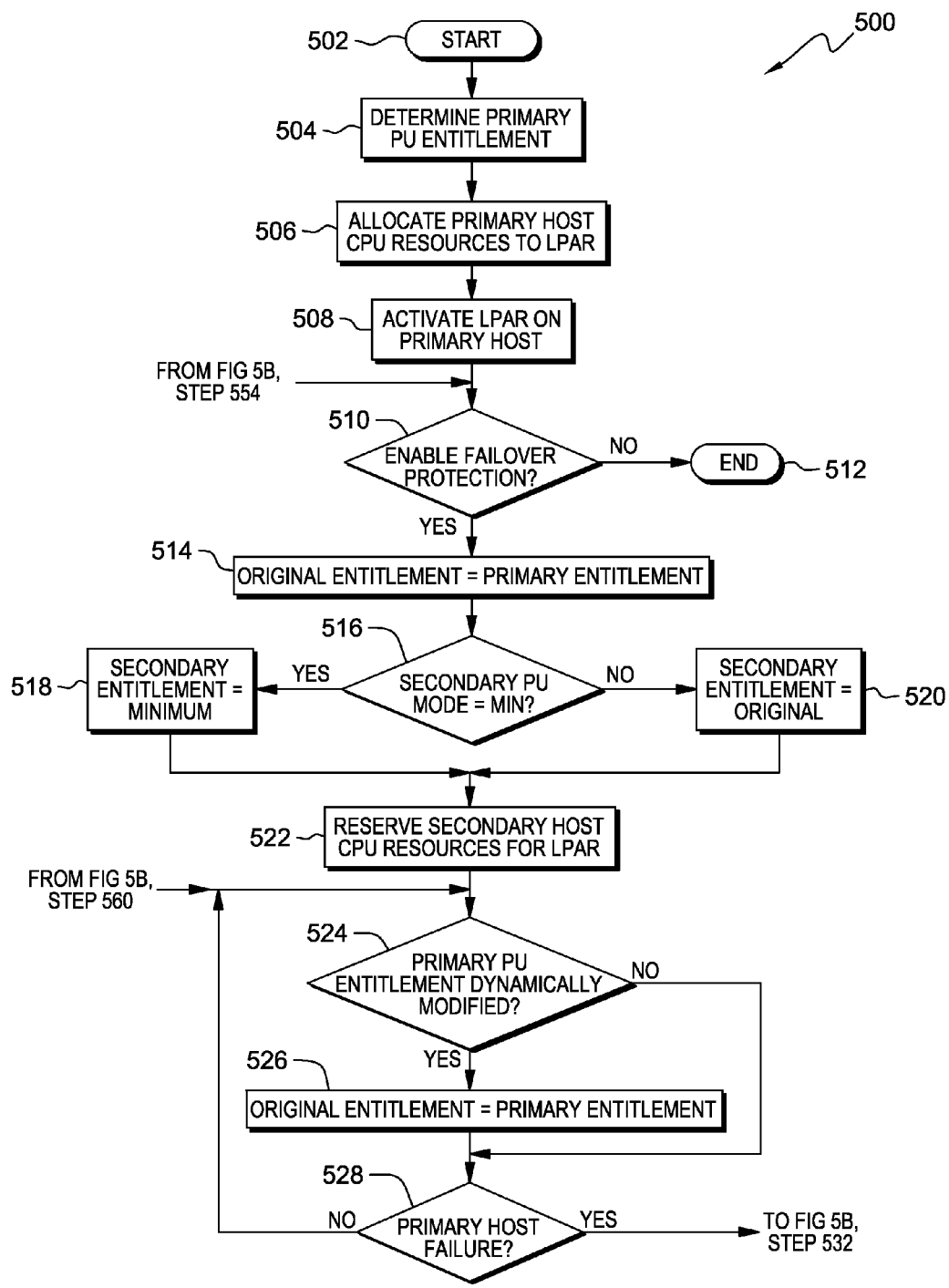
FIG. 5A is Part 1 of a more detailed flow diagram for an example method for reducing CPU resource requirements for a high availability micro-partition.
Figure 5B:
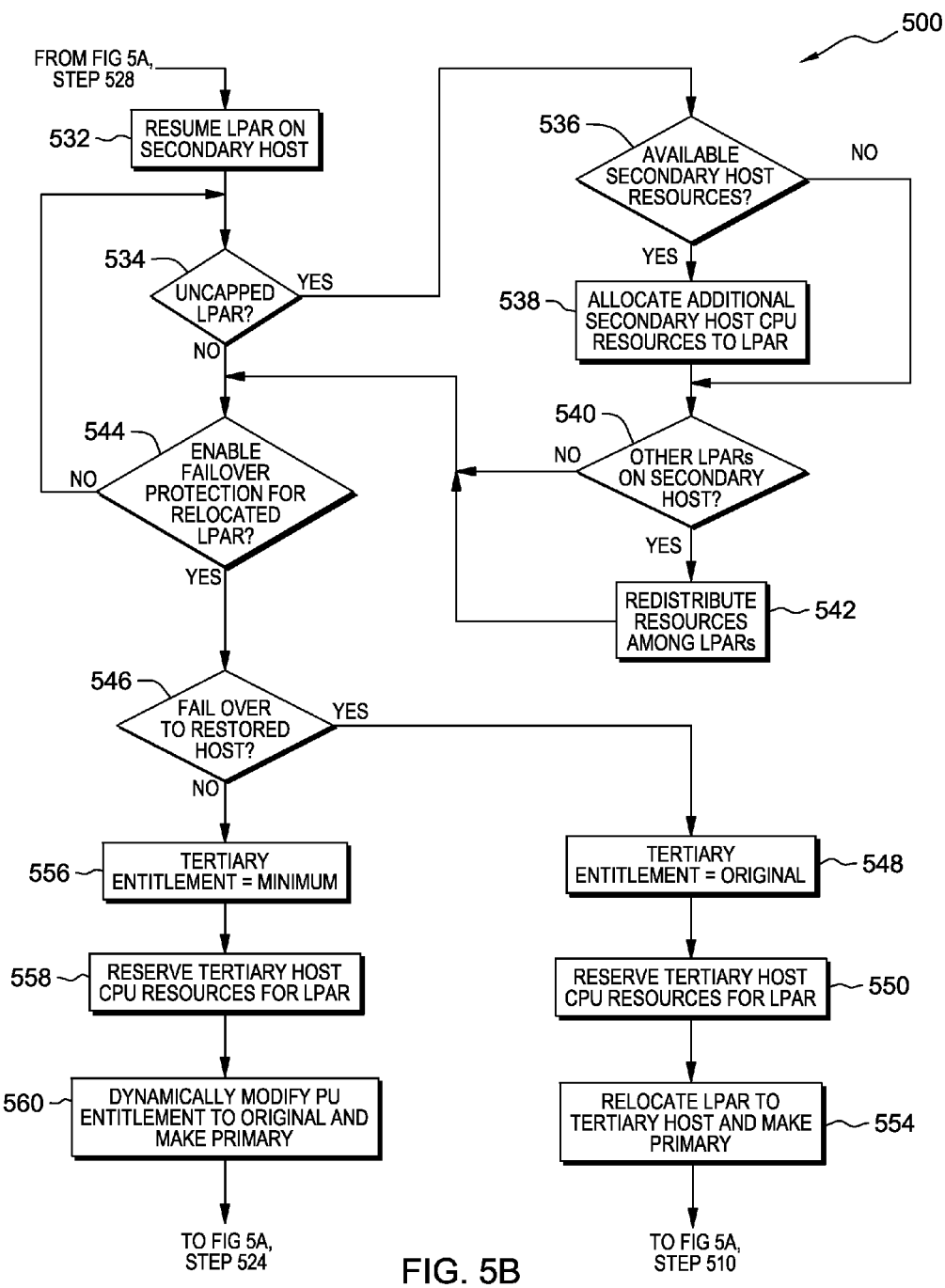
FIG. 5B is Part 2 of a more detailed flow diagram for an example method for reducing CPU resource requirements for a high availability micro-partition.

Flow diagram 500 in FIGS. 5A and 5B is a more detailed flow diagram illustrating an example embodiment of a method for reducing CPU resource requirements for a high availability micro-partition. At step 504, the partition manager determines a primary processing unit entitlement for the logical micro-partition (LPAR). At step 506, the partition manager allocates processing units from the primary shared processor pool equal to the LPAR's primary entitlement and activates the LPAR at step 508.

At step 510, if failover protection is not enabled for this LPAR, then the process ends at step 512 and the LPAR continues to run on the primary host without failover protection or with another method of failover protection. But if failover protection is enabled at step 510, then the primary processing unit entitlement is saved in the LPAR's primary configuration as the original entitlement at step 514. The partition manager checks for whether the secondary processing unit mode is set to "minimum" at step 516. In some embodiments, this mode is user-controllable with a secondary processing unit mode property. If the LPAR is configured for minimum mode at step 516, then the partition manager determines at step 518 a secondary processing unit entitlement for the LPAR that is smaller than the LPAR's primary entitlement, and may be based at least in part on user input and the LPAR's primary configuration. But if the LPAR is not configured for minimum mode at step 516, then the partition manager determines at step 520 a secondary processing unit entitlement for the LPAR that is equal to the LPAR's saved original entitlement. Although not shown in example 500, after determining that failover protection is enabled at step 512, checkpointing or some other method of ensuring high availability of the LPAR begins.

At step 522, the partition manager reserves processing units from the secondary shared processor pool equal to the LPAR's secondary processing unit entitlement: either a minimum quantity or the original quantity as determined in step 516. At step 524, if the primary processing unit configuration has been dynamically modified, then the saved original entitlement configuration parameter is updated to reflect the modification at step 526.

If a primary host failure occurs at step 528, then the partition manager resumes the LPAR on the secondary host at step 532 with a quantity of processing units from the secondary shared processor pool equal to the LPAR's secondary entitlement. At steps 534 and 536, if the LPAR is uncapped and if resources are available in the secondary shared processor pool, then additional CPU resources in excess of the LPAR's secondary processing unit entitlement may be allocated to the LPAR at step 538. At step 540, if multiple LPARs have failed over to the secondary host, then the partition manager may redistribute CPU resources among the secondary host LPARs. The partition manager on the secondary host may be the same partition manager as on the primary host, or may be a different partition manager in communication with the primary partition manager.

Returning to step 534, if the LPAR is not uncapped, or if it is uncapped and after the allocation and/or redistribution of secondary host resources, then step 544 is performed. If failover protection is not enabled for the LPAR in step 544, then the LPAR continues to run on the secondary host without failover protection. If the LPAR is uncapped, then redistribution of secondary CPU resources may continue to be performed periodically. Whether failover protection is enabled for the LPAR when it is running on a secondary host may be a fixed system parameter or may be user-controllable, and may be controlled by the same parameter that controls whether failover protection is enabled in step 510.

If failover protection is enabled at step 544, then a process similar to steps 516-522 is performed. At step 546, the partition manager checks for whether the secondary processing unit mode is set to "minimum" or "original." A secondary processing unit mode of "original" may indicate that the LPAR has been configured to "fail back" to a restored host, and at step 548, the partition manager determines a secondary processing unit entitlement for the LPAR that is equal to the LPAR's saved original entitlement. The partition manager then reserves processing units from a tertiary shared processor pool (which could be, for example, the restored primary shared processor pool or a replacement primary shared processor pool) equal to the LPAR's tertiary processing unit entitlement at step 550. At this point, the LPAR is running on the secondary host and performing checkpoints or otherwise preparing for a failover to the tertiary host. The LPAR may be running with a reduced CPU entitlement, and even if the LPAR has been allocated unconsumed resources that are reserved for another LPAR, the LPAR may be required to drop back down to its minimum entitlement should another LPAR failover.

To complete the restoration, the partition manager relocates the LPAR to the tertiary host at step 554 with the reserved processing units. At this point the LPAR is running on its new (or restored) primary host and the partition manager returns to step 510 to determine whether and how to provide secondary host protection for the LPAR. In some embodiments, the original secondary host may remain as the secondary host for the restored LPAR, and no further steps are necessary to enable failover protection. In that case, the partition manager may return to step 524 rather than step 510 (path not shown).

Returning to step 546, a secondary processing unit mode of "minimum" may indicate that the LPAR may remain permanently on the secondary host, and at step 556, the partition manager determines a minimum secondary processing unit entitlement for the LPAR. The partition manager then reserves processing units from a tertiary shared processor pool (which will serve as the future secondary host) equal to the LPAR's tertiary processing unit entitlement at step 558. At this point, the LPAR is running on the secondary host and performing checkpoints or otherwise preparing for a failover to the tertiary host. The LPAR may be running with a reduced CPU entitlement, and even if the LPAR has been allocated unconsumed resources that are reserved for another LPAR, the LPAR may be required to drop back down to its minimum entitlement should another LPAR failover.

Rather than fail back to a restored host, at step 560 the LPAR's secondary processing unit entitlement is modified to match its original processing unit entitlement and the secondary host is now the LPAR's primary host. The tertiary host is now the secondary host. Checkpointing continues, the LPAR is protected, and the partition manager returns to step 524 to wait for either a dynamic entitlement modification or a primary host failure.

Although example method 500 uses looping constructs where the partition manager continually checks whether a failure has occurred, whether a dynamic modification has occurred, or whether resources require redistribution, these looping constructs are for illustration purposes only and may not reflect the actual methods used. Embodiments may use polling, hardware interrupts, software interrupts, or other techniques for determining when these or other events have occurred or need to be performed. Also, embodiments for reducing resource requirements for high availability micro-partitions may not perform each step shown in example 500, may perform some or all of the steps in a different order, or may perform additional steps not shown. Furthermore, embodiments may combine several steps or expand individual steps into multiple steps.

The major components of a computer system as described herein may include one or more processors, a main memory, a terminal interface, a storage interface, an I/O (Input/Output) device interface, and a network interface, all of which are communicatively coupled, directly or indirectly, for inter-component communication via a memory bus, an I/O bus, and an I/O bus interface unit. The computer system may contain one or more general-purpose programmable central processing units (CPUs). In an embodiment, the computer system may contain multiple processors typical of a relatively large system; however, in another embodiment the computer system may alternatively be a single CPU system. Each processor may execute instructions stored in the main memory and may comprise one or more levels of on-board cache. Main memory may comprise a random-access semiconductor memory, storage device, or storage medium (either volatile or non-volatile) for storing or encoding data and programs. Main memory may alternatively represent the entire virtual memory of the computer system, and may also include the virtual memory of other computer systems coupled to the computer system or connected via a network. Main memory may be conceptually a single monolithic entity, but in some embodiments, main memory is more complex, such as a hierarchy of caches and other memory devices. Main memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

While the invention has been described with reference to the specific aspects thereof, those skilled in the art will be able to make various modifications to the described aspects of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method for managing a logical partition, the method comprising:
    inspecting a partition profile associated with the logical partition, the partition profile configurable by a user through a management entity;
    calculating a secondary processing unit entitlement for the logical partition based at least in part on a secondary processing unit mode property in the partition profile, the secondary processing unit entitlement less than a primary processing unit entitlement associated with the logical partition;
    reserving a quantity of processing units from a secondary shared processor pool for the logical partition, the quantity equal to the secondary processing unit entitlement;
    relocating the logical partition to the secondary shared processor pool in response to a predetermined condition;
    calculating a tertiary processing unit entitlement for the logical partition based at least in part on the secondary processing unit mode property; and
    reserving a second quantity of processing units from a tertiary shared processor pool for the logical partition, the second quantity equal to the tertiary processing unit entitlement.

2. The method of claim 1, further comprising:
    storing the primary processing unit entitlement as a current number of processing units value in a primary configuration data structure, the primary configuration data structure associated with the logical partition and further associated with a primary shared processor pool.

3. The method of claim 2, further comprising:
    storing the secondary processing unit entitlement as a current number of processing units value in a secondary configuration data structure, the secondary configuration data structure associated with the logical partition and further associated with the secondary shared processor pool.

4. The method of claim 2, further comprising:
    modifying the primary processing unit entitlement in response to configuration input from the user through the management entity; and
    storing the modified primary processing unit entitlement as the current number of processing units value in the primary configuration data structure.

5. The method of claim 1, further comprising:
    storing the primary processing unit entitlement as an original number of processing units value in a secondary configuration data structure, the secondary configuration data structure associated with the logical partition and further associated with the secondary shared processor pool, wherein the tertiary processing unit entitlement is equal to the original number of processing units value.

6. The method of claim 5, further comprising:
    relocating the logical partition to the tertiary shared processor pool in response to a second predetermined condition.

7. The method of claim 1, wherein the tertiary processing unit entitlement is equal to the secondary processing unit entitlement.

8. The method of claim 7, further comprising:
    promoting the secondary shared processor pool to the primary shared processor pool; and
    promoting the tertiary shared processor pool to the secondary shared processor pool.

9. The method of claim 1, wherein the management entity is a dedicated workstation.

* * * * *